United States Patent [19]

Pryor

[11] Patent Number: 4,468,174
[45] Date of Patent: Aug. 28, 1984

[54] HELICOPTER TRANSPORTABLE MUD PUMP

[75] Inventor: Dale H. Pryor, Odessa, Tex.
[73] Assignee: Oime, Inc., Odessa, Tex.
[21] Appl. No.: 325,690
[22] Filed: Nov. 30, 1981
[51] Int. Cl.³ .................. F04B 37/00; F04B 23/06; F16D 1/02
[52] U.S. Cl. .................. 417/238; 417/539; 403/337
[58] Field of Search .......... 417/238, 319, 539; 403/335, 336, 337

[56] References Cited

U.S. PATENT DOCUMENTS

| | | | |
|---|---|---|---|
| 57,771 | 9/1866 | Roach | 403/337 |
| 1,637,944 | 8/1927 | Keller | 403/337 |
| 1,750,170 | 3/1930 | Frisch | 417/238 |
| 1,964,679 | 6/1934 | Springfield | 417/238 |
| 2,079,460 | 5/1937 | Marty | 403/336 |
| 2,250,448 | 7/1941 | Edwards | 403/337 |
| 2,561,227 | 7/1951 | Reed | 417/238 |
| 2,585,113 | 2/1952 | Gredell | 403/337 |
| 3,364,871 | 1/1968 | Wilson | 417/539 |
| 3,451,282 | 6/1969 | Appleton | 464/49 |
| 3,500,660 | 3/1970 | Anderson | 403/337 |
| 4,070,120 | 1/1978 | Bald et al. | 403/335 |

Primary Examiner—William L. Freeh
Assistant Examiner—Paul F. Neils
Attorney, Agent, or Firm—Marcus L. Bates

[57] ABSTRACT

A helicopter transportable mud pump made into three stages, each of which are separable from one another. Each pump stage is a light weight sub-assembly which can be lifted by a helicopter into inaccessible locations. The adjacent crankshaft ends of the assembled pump stages are series connected in axially aligned relationship respective to one another by a special coupling means. The coupling means is comprised of two coacting coupling members, each of which have confronting faces connected together in a manner that also causes the adjacent shaft ends of the multi-stage pump to be connected 120° out of phase respective to one another. The coupling halves are identical in design so that only one member must be duplicated during fabrication of the device.

6 Claims, 9 Drawing Figures

HELICOPTER TRANSPORTABLE MUD PUMP

BACKGROUND OF THE INVENTION

There are large drilling rigs specially designed to be airlifted by helicopter into locations inaccesible by other forms of transportation. Therefore, there is also a need for a mud pump which can be easily broken down or disassembled into packages of a size which can be lifted by a helicopter into remote drilling locations. Presently available mud pumps which are light enough to be airlifted are smaller than desired for drilling rigs, and in order to attain the required flow, these pumps must be operated at speeds which cause high maintenance problems. Therefore, it is desirable to have made available a pump apparatus which has the required capacity and which can be dismantled into convenient packages for helicopter transport.

The present invention achieves the above desired results by the provision of a pump having three single acting cylinder commonly known as a trilpex pump. Rather than dismantling the pump into a power end component and fluid end component as has been done in the past, the pump is designed as a three single cylinder assembly, wherein each cylinder is a single acting pump (simplex) with the shaft ends of each simplex pump being axially aligned with one another and connected together with special couplings so that the throws of the three crankshafts are timed 120° apart in order to have a balanced throw and discharge flow.

SUMMARY OF THE INVENTION

A multi-stage pump assembly separable into individual pump stages to facilitate translocation from one to another geographical area. Each stage includes an individual simplex pump having laterally opposed crankshaft ends, a piston connected to the throw of the crankshaft and reciprocatingly received within a cylinder, and a crankshaft housing. The adjacent crankshaft ends of adjacent pump stages are axially aligned with one another and connected together in timed relationship by a coupling means. The coupling means includes a first and a second coupling member, or coupling half, attachable to adjacent shaft ends of adjacent pump stages. Each member has a confronting face and means by which the member are connected together so that the shafts remain in the same timed relationship respective to one another. In the triplex pump of this invention, the throw of the crankshafts remain 120° apart. The coupling halves are substantially identical to one another. Each coupling half has a pin and a pin receiving slot formed at the confronting face thereof, with the pin and slot being circumferentially spaced apart 180° respective to one another, so that the pin of one half is received within the slot of the confronting half, thereby enabling the two halves to be separated vertically from one another.

The pin is located 30° out of phase respective to the location of the crankshaft at top or bottom dead center, thereby causing each piston of any stage to alway be timed 120° out of phase respective to the piston of an adjacent stage.

Accordingly, a primary object of the present invention is the provision of means by which the individual stages of a multi-stage pump assembly is always maintained in proper timed relationship respective to one another.

Another object of the present invention is the provision of a multi-stage pump assembly separable into individual stages to facilitate transport thereof.

Still a further object of the present invention is the provision of a coupling member by which adjacent stages of a multi-stage pump are connected together in timed relationship respective to one another.

Another and still further object of the present invention is the provision of improvements in coupling members for coupling adjacent axially aligned series connected shaft ends together in a manner to maintain each shaft in a predetermined timed relationship respective to an adjacent shaft.

An additional object of the present invention is the provision of a method connecting adjacent series connected shafts together in timed relationship respective to one another.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENT

Figure 1:
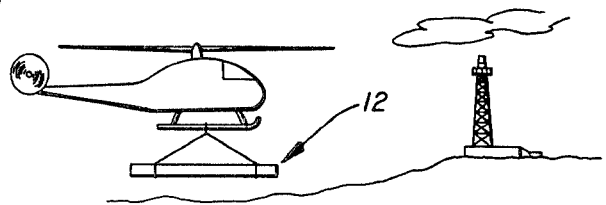
FIG. 1 is a perspective view of one stage of a multi-stage pump being airlifted to a drilling rig.

In the figures of the drawings, there is disclosed a multi-stage pump assembly 10 having a main frame 11 which is separable into individual pump stages 12, 14, and 16. Each of the stages includes a pump barrel 18 and a case 19 through which shaft ends 20, 20' extend in diametrical opposition to one another.

Figure 2:
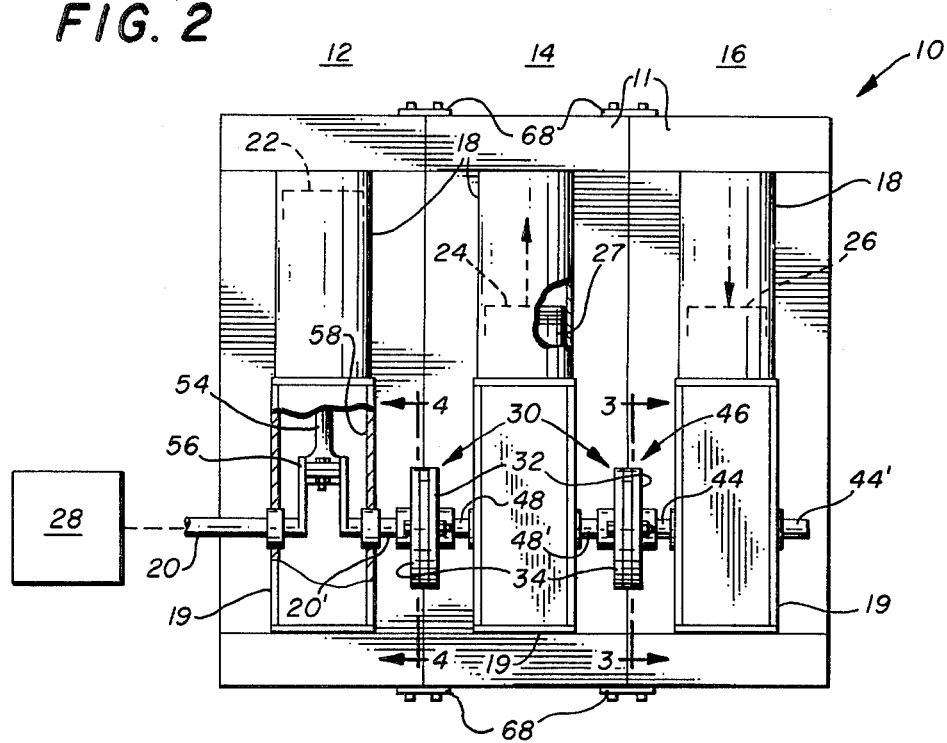
FIG. 2 is a broken, top plan view of a multi-stage pump made in accordance with the present invention, with some parts being broken away therefrom in order to more fully disclose the interior thereof.
Figure 3:
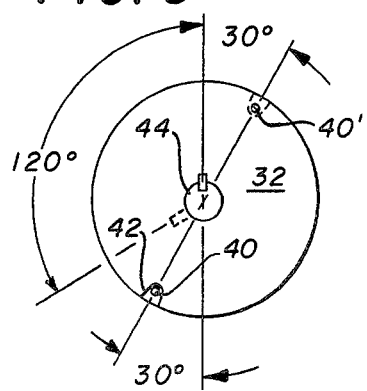
FIGS. 3 and 4, respectively, are cross-sectional views taken along lines 3—3 and 4—4, respectively, of FIG. 2.
Figure 4:
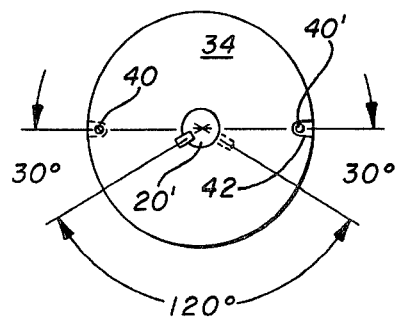

Numeral 22, 24, and 26 of FIG. 2 indicates one of the positions of the pistons of each stage, which preferably are 120° apart so that a balanced crankshaft throw and discharge flow is achieved by the multi-stage pump. Numeral 27 indicates one of the pistons of the multi-stage pump, while numeral 28 indicates a prime mover, which can take on any number of forms.

The adjacent shaft ends of the axially aligned shafts are connected together by a coupling means illustrated herein as a coupling assembly 30. As seen in FIGS. 2-7, each coupling assembly comprises a coupling member 32 and another identical coupling member 34, sometimes also called a coupling half. Each coupling half includes a hub 36 opposed to a face 38. The faces of the coupling members of a coupling assembly confront one another. Each confronting face 38 includes an index pin 40 and a pin receiving slot 42 spaced 180° apart.

Stage 16 inlcudes shaft ends 44 and 44', while stage 14 includes shaft ends 48 and 48'. Stages 14 and 16 present adjacent shaft ends, generally indicated by the arrow at numeral 46, which are connected together 120° out of phase by one of the coupling assemblies of this disclosure.

Each coupling half is provided with a key way 50 and shaft hole 52, although the shaft hole could equally well be splined or otherwise rigidly connected to the coupling hub.

Each pump stage includes the usual connecting rod 54 connected to crank 56 at one end and a piston at the other end thereof. Numeral 58 indicates the interior of a stage of the pump.

Figure 7:
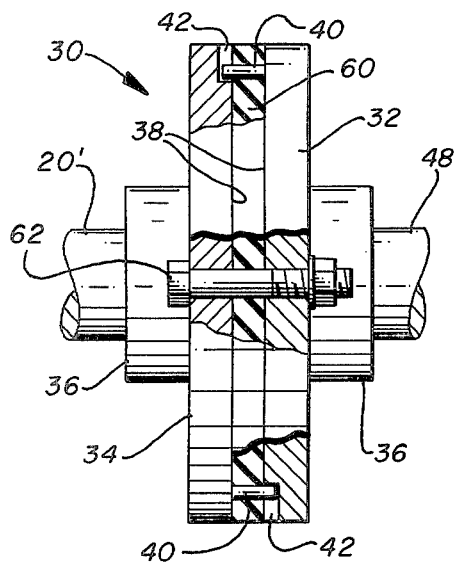
FIG. 7 is an assembled view of one of the coupling members disclosed in FIG. 2.

In FIG. 7, the coupling halves are assembled together with a resilient member 60 being interposed therebetween. Bolt 62 removably affixes one coupling half to the other to provide a complete coupling means.

Figure 8:
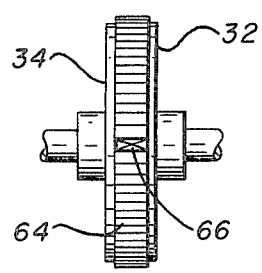
FIG. 8 sets forth a modification of FIG. 7.
Figure 9:
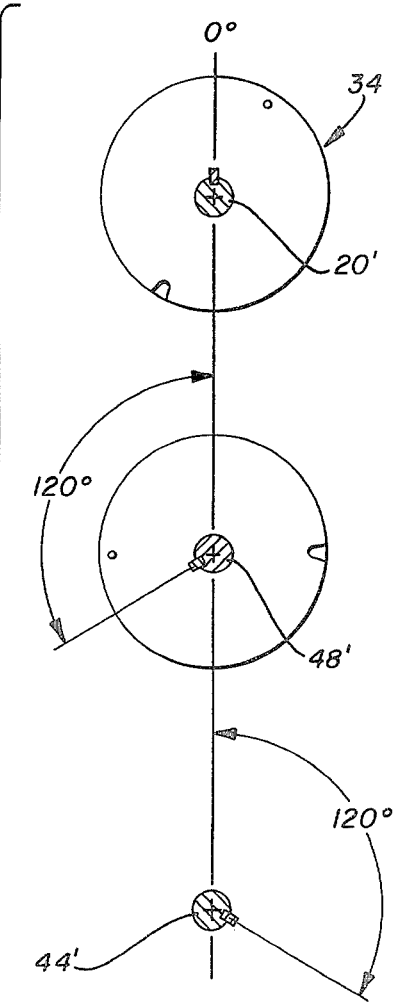
FIG. 9 is a diagrammatical representation of part of the apparatus disclosed in FIG. 2.

In FIG. 8, the two coupling halves are joined together by a seperable endless chain 64 having a master link 66 included therein by which the chain can be removed from the halves, and the stages of the pump separated.

In FIG. 2, numeral 68 broadly indicates attachment means by which the frame of the individual stages of the multistage pump can be disconnected one from the other.

Figure 5:
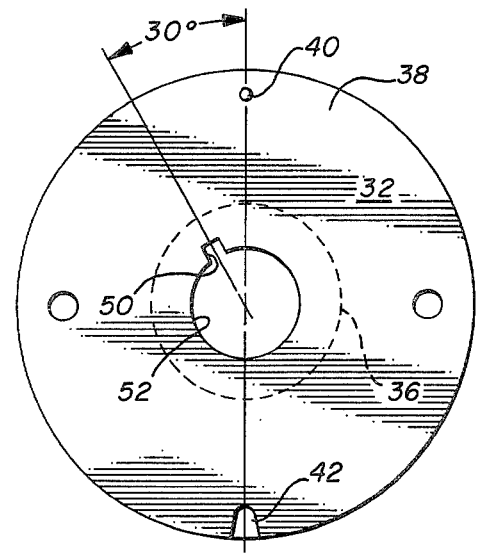
FIG. 5 is an enlarged, front view of part of the apparatus disclosed in FIG. 2.
Figure 6:
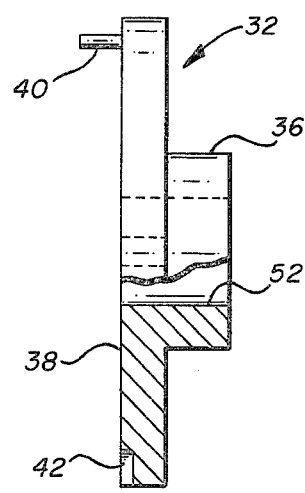
FIG. 6 is a side elevational view of FIG. 5.

As seen in FIGS. 5 and 6, together with other figures of the drawings, each coupling half includes a pin 40 and slot 42 formed at the confronting face 38 thereof, with the pin and slot being circumferentially spaced 180° apart respective to one another so that the pin of one half 32 is received within the slot of a confronting half 34, thereby enabling the halves to be separated vertically from one another and at the same time maintaining adjacent shaft ends of adjacent stages timed in proper sequence respective to one another.

The pin 40 is located 30° out of time respective to the crank of the shaft end to which the coupling half is attached. Key way 50 usually is indexed with the top dead center of the piston. In the present disclosure, the pin 40 can be indexed 30° out of phase either before or after top dead center or bottom dead center.

Identical coupling halves 32 and 34, when joined together at 30 in the manner of FIGS. 2, 7, and 8, cause the adjacent shaft ends of the three pump stages to be oriented respective to one another to cause the crank throws to be 120° out of phase. Accordingly, the employment of four identical coupling havles, 32 or 34, to provide two coupling means or coupling assemblies 30 of FIGS. 7 and 8, by which the three stages of the multistage pump are tied together, results in the cranks of the three stages always being 120° out of phase. This enables the prime mover 28 to continually deliver smooth power to the multistage pump, and the flow from the multi-stage pump is continuous because one of the stages is always positively displacing fluid therefrom.

I claim:

1. A multi-stage pump assembly which includes three stages, each stage being separable into individual stages to enable each of the individual stages to be transported by helicopter from one to another geographical location;

each individual stage includes a crankshaft housing and a main frame, a cylinder attached to said housing, a piston reciprocatingly received within said cylinder, said crankshaft being attached to said crankshaft housing and having a marginal end which extends laterally away from said housing for connection to a prime mover;

attachment means by which the main frame of each individual stage can be disconnected one from the other;

a coupling means by which axially aligned series connected shafts may be connected together in timed relationship respective to one another;

said coupling means includes a first and second member each having confronting faces, and each member having means by which the member can be attached to a shaft end, means releasably connecting said first and second members together;

index means on said coupling means by which one shaft is oriented respective to an adjacent shaft to cause each of the series connected shafts to be connected in timed relationship;

said index means includes a pin and pin receiving slot located in spaced relationship and arranged 180° apart on the confronting face of each coupling member, the pin of one coupling member is received within the slot of another coupling member.

2. The pump assembly of claim 1 wherein the pin is located 30° out of phase with respect to the shaft, so that each series connected shaft is 120° out of phase with one another.

3. A multi-stage pump assembly which includes three stages, each stage being separable into individual stages to enble each of the individual stages to be transported by helicopter from one to another geographical location;

each individual stage includes a crankshaft housing and a main frame, a cylinder attached to said housing, a piston reciprocatingly received within said cylinder, said crankshaft being attached to said crankshaft housing and having a marginal end which extends laterally away from said housing for connection to a prime mover;

attachment means by which the main frame of each individual stage can be disconnected one from the other;

a coupling means by which axially aligned series connected shafts may be connected together in timed relationship respective to one another;

said coupling means includes a first and second member each having confronting faces, and each member having means by which the member can be attached to a shaft end, means releasably connecting said first and second members together;

a pin and slot formed at the confronting face thereof, with the pin and slot being circumferentially spaced 180° apart respective to one another; said slot opens radially outwardly so that the pin of one coupling member is received within the slot of a confronting coupling member, thereby enabling the coupling members to be separated vertically from one another, and formed an index means on said coupling means by which one shaft is oriented respective to an adjacent shaft to cause each of the series connected shafts to be connected in timed relationship.

4. A multi-stage pump assembly comprised of a plurality of simplex pumps, which are separable into individual light-weight pump stages to facilitate helicopter transport thereof from one to another geographical location; each said pump stage includes a crankshaft and a piston with said crankshaft being enclosed within a crankshaft housing, a cylinder connected to said housing, means by which the piston is connected to said crankshaft and is reciprocatingly received within the cylinder; said crankshaft extends laterally of said housing and includes shaft ends by which the individual shafts of each pump stage can be connected to one another and by which a prime mover can be operatively connected thereto;

attachment means by which the individual pump stages can be disconnected one from the other to thereby provide a plurality of said individual light-weight pump stages; said individual pump stages, when connected together by said attachment means, have the crankshafts thereof aligned along a common longitudinally extending centerline;

coupling means by which adjacent shaft ends of adjacent pump stages are connected together only when the pistons of each said pump stage are arranged in timed relationship respective to one another, thereby precluding the pump stages of said multi-stage pump from being attached together in untimed relationship by said attachment means;

said coupling means includes a first and second coupling half which is attached to adjacent shaft ends of adjacent stages to thereby connect the crankshaft of one stage to the crankshaft of another stage;

each coupling half has a face formed thereon which confronts the face of the other half of the coupling means, and means connecting the two coupling halves together so that the shafts remain in the same relative position respective to one another;

each coupling half has a pin and slot formed at the confronting face thereof, with the pin and slot being circumferentially spaced 180° apart respective to one another; said slot opens radially outwardly so that the pin of one half is received within the slot of a confronting half, thereby enabling the coupling halves to be separated vertically from one another;

whereby, said attachment means release each pump stage one from the other to provide said individual light-weight pump stages which are of a weight to enable said pump stage to be transported by helicopter to a different geographical location, whereupon the pump stages are then assembled into said multi-stage pump by use of said attachment means and said coupling means.

5. The pump assembly of claim 4 wherein said coupling halves are substantially identical to one another, there are three stages in said multi-stage pump, said pin is located 30° out of time respective to the location of the crankshaft at either of top dead center and bottom dead center, thereby causing each of the pistons to be timed 120° out of phase respective to one another.

6. A multi-stage pump assembly comprised of a plurality of simplex pumps, which are separable into individual light-weight pump stages to facilitate helicopter transport thereof from one to another geographical location; each said pump stage includes a crankshaft and a piston, said crankshaft is enclosed within a crankshaft housing, a cylinder connected to said housing, means by which the piston is connected to said crankshaft and is reciprocatingly received within the cylinder; said crankshaft extends laterally of said housing and includes shaft ends by which the individual shafts of each pump stage can be connected to one another and by which a prime mover can be operatively connected thereto;

attachment means by which the individual pump stages can be disconnected one from the other to thereby provide a plurality of said individual light-weight pump stages; said individual pump stages, when connected together by said attachment means, have the crankshafts thereof aligned along a common longitudinally extending centerline;

coupling means by which adjacent shaft ends of adjacent pump stages are connected together only when the pistons of each said pump stage are arranged in timed relationship respective to one another, thereby precluding the pump stages of said multi-stage pump from being attached together in untimed relationship by said attachment means;

said coupling means includes two confronting coupling halves each affixed to a shaft end of adjacent stages; each said coupling half has a pin and slot formed at the confronting face thereof with the pin and slot being circumferentially spaced 180° apart respective to one another so that the pin of one half is received within the slot of a confronting half, said slot outwardly opens radially away from the shaft axis thereby enabling the halves to be separated vertically from one another;

said coupling halves are substantially identical to one another, there are three stages in said multi-stage pump, said pin is located 30° out of time respective to the location of the crankshaft at top dead center, thereby causing each of the pistons to be timed 120° respective to one another;

whereby, said attachment means release each pump stage one from the other to provide said individual light-weight pump stages which are of a weight to enable said pump stage to be transported by helicopter to a different geographical location whereupon the pump stages are then assembled into said multi-stage pump by use of said attachment means and said coupling means.

\* \* \* \* \*

UNITED STATES PATENT AND TRADEMARK OFFICE
CERTIFICATE OF CORRECTION

PATENT NO. : 4,468,174
DATED : AUGUST 28, 1984
INVENTOR(S) : DALE H. PRYOR

It is certified that error appears in the above—identified patent and that said Letters Patent is hereby corrected as shown below:

Column 1, line 21, "trilpex" should read --triplex--;
Line 47, "member" should read --members--;
Line 61, "alway" should read --always--;
Column 4, line 31, "enble" should read --enable--;
Line 59, delete "formed" after "and" and insert --formed-- after "means".

Signed and Sealed this

Nineteenth Day of February 1985

[SEAL]

Attest:

DONALD J. QUIGG

Attesting Officer          Acting Commissioner of Patents and Trademarks